Dec. 6, 1960 L. D. SANDERS 2,963,180
AUTOMOBILE PARKING APPARATUS
Filed April 11, 1958 9 Sheets-Sheet 1

Fig. 1

INVENTOR.
LEON DONALD SANDERS
BY
Morgan, Finnegan, Durham & Pine
ATTORNEYS.

Dec. 6, 1960 L. D. SANDERS 2,963,180
AUTOMOBILE PARKING APPARATUS
Filed April 11, 1958 9 Sheets-Sheet 3

INVENTOR.
LEON DONALD SANDERS.
BY
Morgan, Finnegan, Durham & Pine
ATTORNEYS.

Dec. 6, 1960  L. D. SANDERS  2,963,180
AUTOMOBILE PARKING APPARATUS
Filed April 11, 1958  9 Sheets-Sheet 7

INVENTOR.
LEON DONALD SANDERS.
BY
Morgan, Finnegan, Durham, Pink
ATTORNEYS.

Dec. 6, 1960  L. D. SANDERS  2,963,180
AUTOMOBILE PARKING APPARATUS
Filed April 11, 1958  9 Sheets-Sheet 8

INVENTOR.
LEON DONALD SANDERS
BY
Morgan, Finnegan, Durham & Pine
ATTORNEYS.

2,963,180

AUTOMOBILE PARKING APPARATUS

Leon Donald Sanders, York, Pa., assignor to Systematic Parking Company, York, Pa., a corporation of Washington Filed Apr. 11, 1958, Ser. No. 727,938

6 Claims. (Cl. 214—16.1)

This invention relates generally to article handling and transporting facility wherein an elevator and associated mechanism is adapted to move an article or material from one place to another in a multi-storied building. It is particularly related to the means for moving an automobile onto an elevator and thence into any particular stall or bay on any desired floor of a multi-floored building reached by the elevator.

Objects and advantages of the invention will be obvious herefrom, or may be learned by practice with the invention, the same being realized and attained by means of the instrumentalities and combinations pointed out in the appended claims.

It is an object of this invention to provide an improved vehicle parking facility of the type employing an elevator to transport vehicles to and from the various floors of a multi-story building and wherein the elevator carries transfer mechanism to transfer vehicles to and from the elevator and floors. Another object of the invention is to provide, in such a parking facility, motor driven transfer mechanism for transferring the vehicles to and from the elevator with the transfer mechanism being receivable beneath the vehicle and including means to raise the vehicle and support it solely from the transfer mechanism without damage to the undercarriage of the vehicle. Still another object is to provide, in such a facility, transfer mechanism that raises the front end of the vehicle through cradling engagement of the front wheels. Still another object is to provide such a transfer mechanism that is freely insertable beneath a vehicle and cradlingly engages the front wheels thereof after it is properly inserted therebeneath. Still another object is to provide, in a parking facility, such a transfer mechanism that includes a dolly that is movable transversely of the elevator and carries wheel engaging members that are retractable to a position permitting unobstructed insertion of the dolly beneath a vehicle and after being properly inserted therebeneath are laterally movable to a position in cradling engagement with the wheels for raising the front end of the vehicle. Still another object is to provide, in a parking facility, such a transfer mechanism with the means on the dolly for raising the vehicle so that it is supported from the dolly being motor operated and suitable control means being provided so that a predetermined operating sequence is had and improper operation of this raising means which might result in damaging the vehicle is prevented. Another object is to provide, in such a storage facility, an elevator and transfer apparatus that is reliable in operation and assures that the vehicles will not be damaged during handling.

In general the invention consists of a transfer device which is of a height and width as will permit it to be rolled longitudinally beneath an automobile and then raise the automobile slightly to be supported thereon. One or more of the transfer devices may be mounted over guide rails on a carriage which is mounted on tracks within the frame-work of an elevator and adapted to be moved sideways therein. The elevator is vertically movable on stationary guides provided in a shaftway of a multi-storied building each floor of which is provided with stalls or bays leading off two opposite sides of the shaftway. The width of the shaftway from the bank of stalls on one side to the bank of stalls on the other side is somewhat greater than the length of a passenger automobile and the depth of the stalls or bays from the shaftway to a wall is sufficient to receive two automobiles in tandem. Thus the transfer devices can move a car from the carriage on the elevator into a selected position in a selected stall on either side of the shaftway and deposit it there. Operation of the elevator brings the carriage and transfer devices to a desired level in the vertical bank of stalls and movement of the carriage on the elevator brings the transfer devices into alignment with any stall on the selected floor. Movement of the various mechanisms is under manual control and accomplished through suitable motor operators such as hydraulic or electrical motor means or combinations thereof.

More particularly the invention comprises mechanism mounted upon the transfer device which, when the device is rolled beneath an automobile, will first swing a pair of arms pivotally mounted on each side of the forward end of the device so that the arms contact the lower periphery of each front wheel of the automobile and cradle it. A platform on which the paired arms are pivotally supported and a second platform on the rear of the transfer device are then actuated by hydraulic means to raise the automobile from the surface upon which it was standing so that it will be fully supported upon the transfer device. The proper sequential action of the paired arms in relation to the raising or lowering of the front and rear platforms of the transfer device may be accomplished by a slidable rod and connected at one end to a moving part of the lever system which raises the front platform and having the rear of the rod actuate a hydraulic valve in the pressure line leading to the arms-actuating hydraulic cylinders. By this arrangement the platforms are constrained to act only subsequent to or prior to the movement of the arms, depending upon whether the arms are to be retracted or extended.

The transfer device comprises a vehicle carrying portion or dolly which can be rolled along a surface, and an extension slide which is slidably mounted on and within the dolly. Both the dolly and extension slide cooperate with a pair of guide rails secured on the carriage whereby the dolly and slide are guided in a straight line on or off the carriage and thus into and out of the various stalls or bays. Movement of the transfer device in relation to the carriage and stalls is manually controlled and accomplished by a system of cables, pulleys and power-driven drums as more fully explained in my copending application, Serial No. 635,050, filed January 18, 1957, now United States Patent No. 2,845,189.

The invention consists in the novel parts, constructions, arrangements, combinations and improvements herein shown and described.

The accompanying drawings, referred to herein and constituting a part hereof, illustrate embodiments of the invention and together with the description, serve to explain the principles of the invention.

Figure 1:
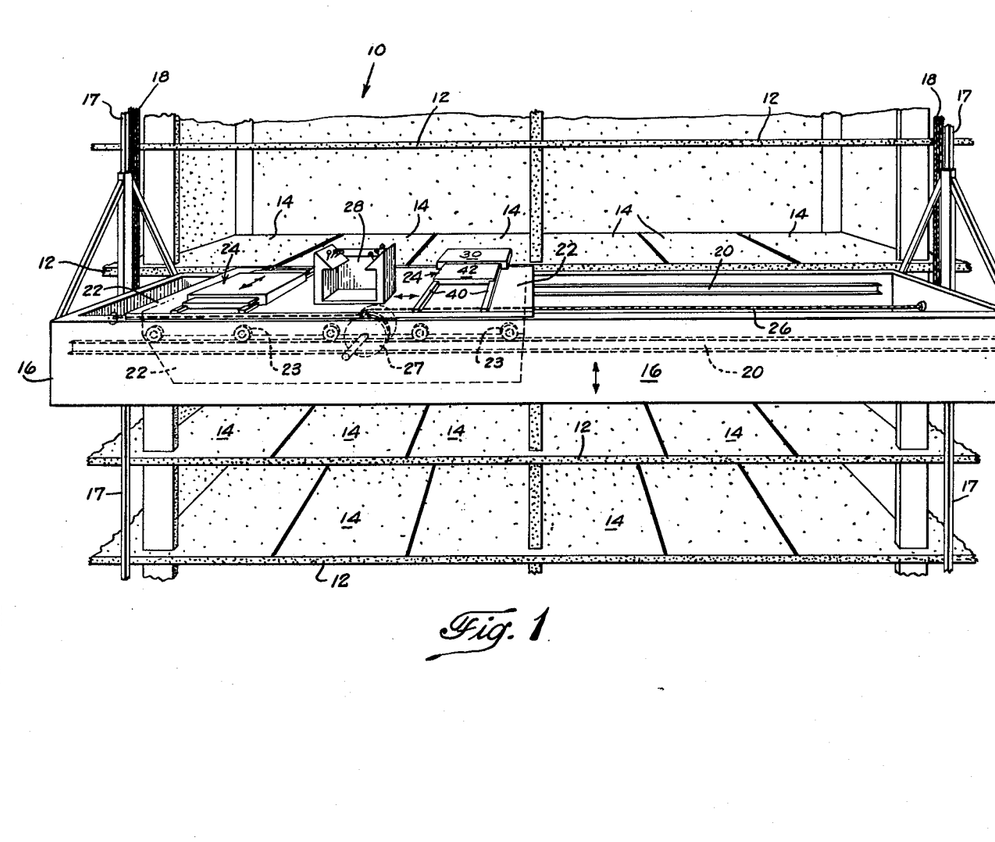
Figure 1 is a fragmentary view of a multi-storied building having two banks of horizontally spaced storage stalls or bays between which is located an elevator and associated devices for conveying vehicles and the like to and from the stalls, with one bank of stalls omitted from the view.

Referring now to the drawings, wherein like reference characters designate like elements, the illustrative and preferred embodiment of the invention shown therein comprises a multistoried building 10 which has numerous vertically spaced floors 12 each of which is provided with horizontally spaced areas or stalls 14 with these stalls wide enough to accommodate easily a standard passenger automobile and long enough to receive two such vehicles in tandem. As shown in Figure 1 an elevator 16 is provided in the building 10 and adapted to move vertically therein along guides 17 and by means of cables 18 in a conventional manner. The horizontal length of the elevator 16 is such as to extend in front of numerous stalls (six in the illustrative embodiment) and its width is somewhat greater than the length of a standard automobile. The elevator 16 is in a shaftway of the building 10 which may be so constructed that each of the long sides of the elevator is adjacent to a bank of stalls 14, only a portion of one such bank being shown in Figure 1.

On the inside of each of the long sides of the elevator 16 there is secured a rail 20 on which a carriage 22 is adapted to roll by means of its rollers 23. The width of carriage 22 is about the same as the width of the elevator 16 but its length may be varied in accordance with the number of transfer devices 24 mounted thereon, two such devices being shown in the drawings. Movement of the carriage 22 lengthwise of the elevator 16 brings either one or the other of the transfer devices 24 opposite any one of the stalls 14 and may be accomplished by means of a cable 26 having each end anchored to an end wall of the elevator 16 and its intermediate portion snubbed around a drum 27 which is rotatably mounted in the carriage 22. The drum 27 may be driven by hydraulic means (not shown) and manually controlled from the control booth 28 mounted on the carriage. Movement of the carriage 22 along thee rails 20 results when the drum 27 is rotated and its direction is determined by the clockwise or counter-clockwise rotation of the drum.

To transfer one or more vehicles from one parking area to another parking or storage area within a building the vehicle must be raised from the parking surface, transported to the carriage on the elevator and thence by appropriate operation of the carriage and elevator moved adjacent another area, as a storage stall, and then moved off the carriage and deposited in the proper position in this area or stall. The transfer devices 24 are provided to transport the vehicles onto and off of the carriage. Each of the transfer devices 24 includes a dolly 30 positioned crosswise on the carriage 22 and adapted to support a vehicle to transfer it to or from the carriage. The dolly 30 is comprised of a rigid frame which includes elongated structural side members 31 extending along each side of the dolly from end to end and tied together in spaced parallel relationship by various cross members such as floor plates 32, or other means. Along the outer face of the side members 31 are mounted numerous rollers 34 each of which is journalled upon a shaft 35 which at one end is secured in a bore in the side member and at the other end is supported in one of a plurality of secondary side members 36. The secondary side members 36 may be supported by the side members 31 through the means of strut plates 37 which may be welded thereto. The dolly rollers 34 engage the floor 38 of the carriage 22 and provide for easy movement of the dolly across the carriage and into the stalls 14 on either side thereof. The dolly is guided in its movement by a pair of guide rails 40 welded to and extending across the carriage floor 38 immediately inward of the side members 31 of the dolly frame.

Figures 2, 3, 4:
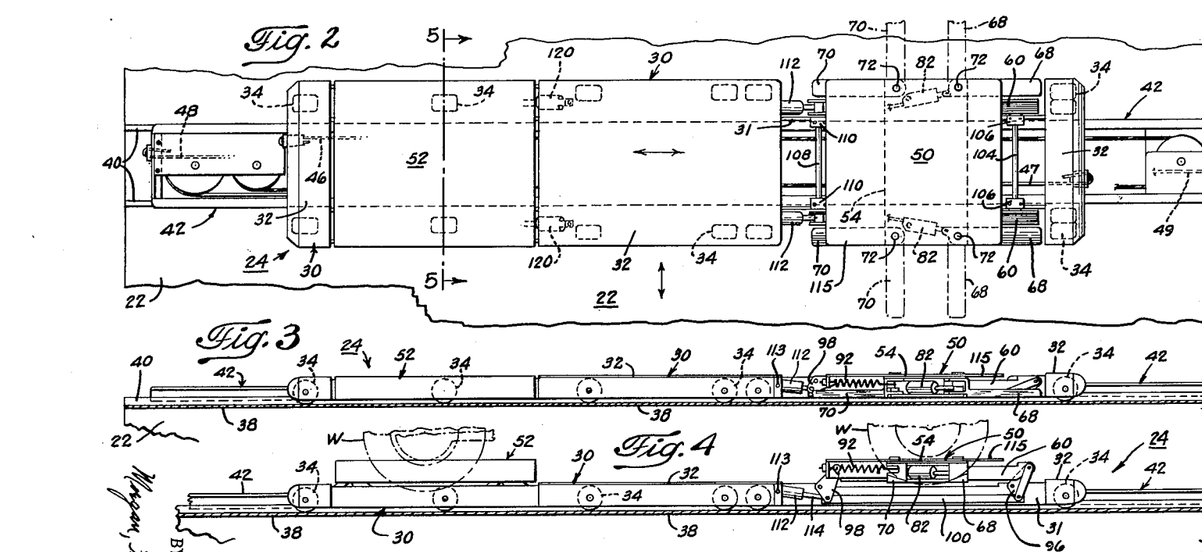
Figure 2 is a plan view of one of the transfer devices as mounted on a carriage which constitutes part of an elevator mechanism and showing the device in its central position between the two banks of storage stalls.
Figure 3 is a side elevation of the transfer device shown in Figure 2 with the vehicle raising portions shown in their lower and retracted positions.
Figure 4 is similar to Figure 3 but with the vehicle raising portions shown in their upper positions and supporting a vehicle thereon as partially indicated by dot and dash lines.
Figure 5:
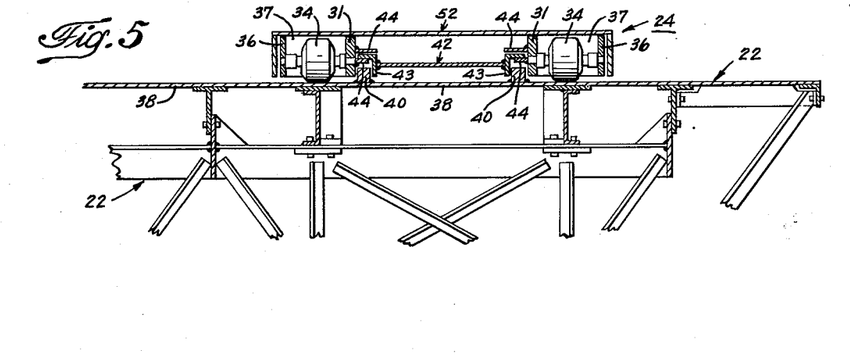
Figure 5 is a fragmentary transverse section through the transfer device and a portion of the carriage as viewed along the line 5—5 of Figure 2.

As shown in Figure 2 the dolly 30 is substantially shorter than the width of the carriage 22 and is only sufficiently long to accommodate the undercarriage of a vehicle with a length of 17 feet being satisfactory for this purpose. However, notwithstanding the relatively short dolly it has a controlled movement off the carriage and into the stalls adjacent thereto a distance whereby two cars may be parked in tandem in a stall. To achieve this, lateral movement of the dolly is effected through the action of an extension slide 42 mounted beneath and slidably carried by the dolly. The slide 42 is provided along each side with an angle bar 43 the horizontal leg of which is slidably carried between spaced brackets 44 mounted upon the inner faces of the dolly side members 31 as by welding. The extension slide is substantially longer than the dolly, preferably being only slightly shorter than the width of the carriage, and extends an equal distance from each end of the dolly when the dolly is in its normal position midway between the long sides of the elevator 16 with the dolly and extension slide being in their normal position, i.e. not extended from either side of the elevator. See Figure 2. When the dolly 30 is moved beyond the confines of the carriage 22 its straight line motion is still controlled by the guide rails 40 and the vertical legs of the angle bars 43 since the extension slide 42 never wholly moves off the carriage. Longitudinal movement of the transfer device 24 in relation to the carriage may be effected through a cable drive mechanism partially illustrated in Figure 2 by cables 46 and 47 which are anchored on the ends of the dolly and cables 48 and 49 which are anchored on the ends of the extension slide 42. Since the details of the cable drive mechanism form no part of this invention further showing is not deemed necessary.

Referring now to vehicle raising and supporting mechanism forming part of the dolly 30, two platforms are provided; a forward platform 50 (right in Figure 2) and a rear platform 52. The forward platform 50 comprises a main plate 54 (Figs. 6–10) having its length positioned crosswise of the dolly and provided near each outer end with a guide channel 56 in which is received a plurality of rollers 58 on which the main plate 54 is adapted to roll longitudinally of the dolly. The rollers 58 are journaled in a jack bar 60 one of which is provided along each side of the dolly and preferably has a length considerably greater than the width of the main plate 54. Thus from a central position on the jack bars 60 the forward platform 50 can be rolled on rollers 58 either forwardly or rearwardly of the dolly to the extent permitted by the length of the jack bars 60. The platform 50 is at all times urged to a central position on the jack bars by a pair of opposing tension springs 61 and 62, shown in Figure 6, with the forward or right end of spring 61 anchored at 63 on the dolly side member 31 and its rear end anchored by a bracket 64 secured to the underside of the main plate 54 near its rear edge. Spring 62 is anchored to the side member 31 of the dolly at 65, which is considerably to the rear of anchor point 63 of spring 61, and has its forward end anchored by a bracket 66 secured to the forward edge of the main plate 54. Thus if platform 50 is moved forward along the rollers 58 (right in Figure 6) the spring 61 is stretched and tends to return the platform to its central position while movement of the platform to the rear (left) stretches the spring 62 which in its turn tends to return the platform to the central position.

Figure 6:
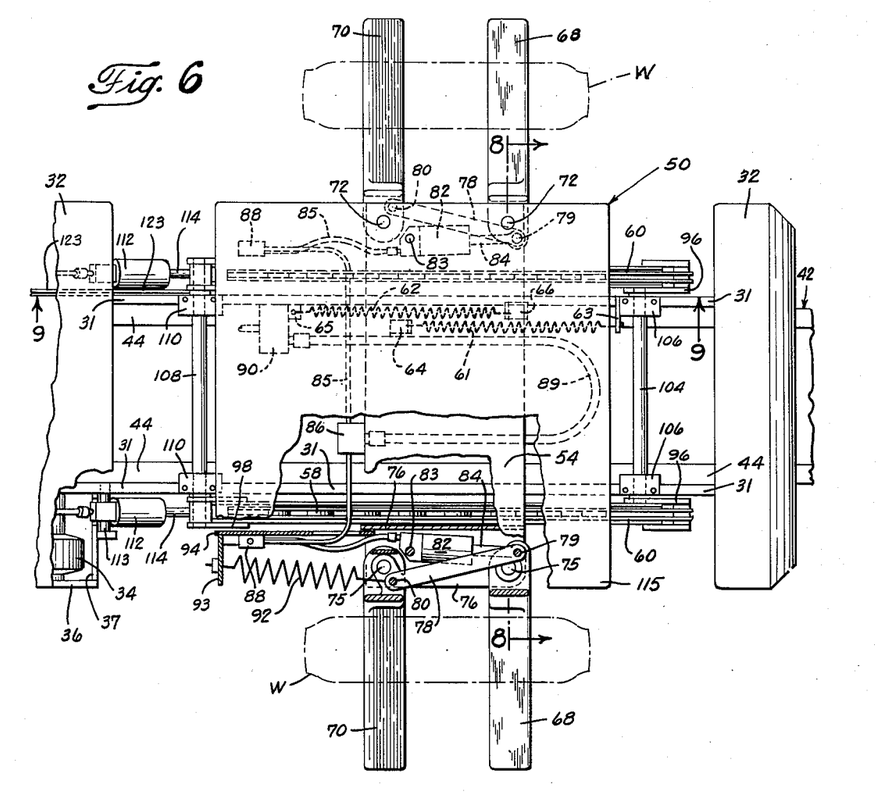
Figure 6 is a partial plan view with parts broken away of the front end of the transfer device as shown at the right of Figure 2 with the various parts in the positions assumed when a vehicle is supported thereon in a raised position.

Each side of the forward platform 50 is provided with a pair of swingable arms adapted to swing horizontally outward from the platform so as to contact and cradle the front wheel of a vehicle. Each pair of arms comprises a forward arm 68 and a rear arm 70. The pivoted end of each arm is forked and has its upper tine 71 journaled on a stub shaft 72 which is secured, as by a nut 73, to a corner of the main plate 54. The lower tine 74 is provided with a stub shaft 75 which is in vertical, axial alignment with stub shaft 72 and journaled in the horizontal reach of an angle bracket 76 the vertical reach of which is welded or otherwise secured to the main plate 54. The arms 68 and 70 of each pair are connected together at their pivoted ends by a link 78 one end of which is pivoted at 79 to the arm 68 and the other end of which is pivoted at 80 to the arm 70. Pivot 79 is inwardly spaced, that is toward the center of the dolly, from the pivot 75 of arm 68 while pivot 80 is outwardly spaced from the pivot 75 of the arm 70 (as shown in Figure 6). By this arrangement the arms 68 and 70 of each pair are constrained to move together but in opposite directions. In Figure 2 each pair of arms is shown in their retracted position by solid lines while dot and dash lines indicate their positions when extended to cradle a vehicle wheel. Movement of the arms from the retracted to the extended position is accomplished by the application of pressure in a hydraulic cylinder 82 associated with each pair of arms. As embodied the hydraulic cylinder 82 is pivotally mounted on a vertical rod 83 secured in the main plate 54 and the angle bracket 76 and has the outer end of its piston rod 84 pivotally connected to the link pivot 79 of arm 68. Hydraulic fluid is supplied to each cylinder 82 through a conduit 85 leading from a manifold block 86 (Fig. 6) through a junction block 88 to the rear of the cylinders. The manifold 86 is secured on the main plate 54 of the platform 50 and since the platform is movable in relation to the dolly flexible tubing 89 is provided to connect the manifold with a junction member 90 which is mounted on one of the side members 31 of the dolly.

Movement of the arms 68 and 70 from their extended position, as shown in Figure 6, to their retracted position, as shown in Figure 2, is accomplished by a tension spring 92 one end of which is anchored to the pivot 80 of arm 70 and the other end adjustably anchored to a plate 93 which is supported by a bracket member 94 that extends rearwardly from the angle bracket 76.

The upper surfaces of the arms 68 and 70 are beveled downwardly toward each other so that when they engage the vehicle wheel these surfaces are substantially tangential to the wheel periphery. When the arms 68 and 70 are in their extended or car wheel engaging position they are substantially parallel to each other and just engage the car wheel without acting to raise or move it in any way.

Figure 7:
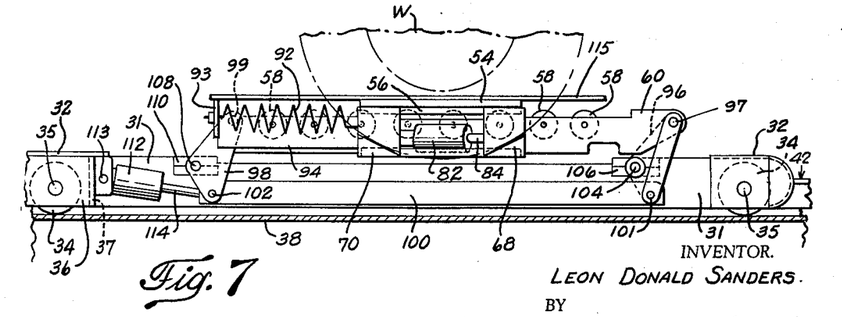
Figure 7 is a side elevation of the mechanism shown in Figure 6.
Figure 8:
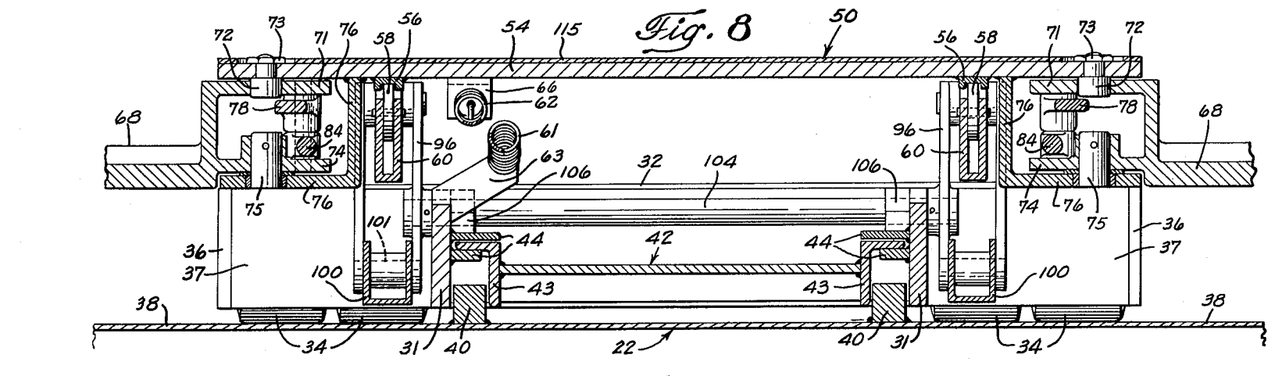
Figure 8 is a transverse section of the front platform of the transfer device as viewed along the line 8—8 of Figure 6.

Means for raising and lowering the jack bars 60 on which the forward platform 50 is rollably mounted are provided and as embodied comprise a lever 96 pivotally connected at 97 to the forward end, right in Figure 7, of each jack bar; a similar pair of levers 98 pivotally connected at 99 to the rear end of each jack bar; and a pair of links 100 each having one end pivotally connected at 101 to one of the forward pair of levers 96 and the other end pivotally connected at 102 to one of the rear pair of levers 98. The two forward levers 96, one on either side of the dolly, are fixed upon opposite ends of a shaft 104 which is transversely mounted on the dolly in split bearing blocks 106 (Figs. 6 and 7) one of which is secured on each side member 31 of the dolly. Similarly the two pairs of rear levers 98, one pair on each side of the dolly, are fixed upon opposite ends of a shaft 108 which is transversely mounted on the dolly in split bearing blocks 110. The shafts 104 and 108 act as the pivots about which the levers 96 and 98 oscillate. By this arrangement the jack bars 60 and hence the forward platform 50 can be raised and lowered so that the platform is always maintained in a horizontal position and the arms 68 and 70, being mounted on the platform partake of the same movement.

Hydraulic means are provided for raising and lowering the platform 50 and consists of hydraulic cylinders 112, one being pivotally mounted on each side of the dolly as by a pin 113 and having the outer end of their piston rods 114 attached to the pivots 102 in the paired levers 98. Thus, application of fluid pressure within the cylinders 112 causes the levers 98 and, through the link 100, the levers 96 to rotate counterclockwise and raise the platform 50, arms 68 and 70 and the front of the vehicle whose front wheels W are cradled upon the arms. The release of pressure within the cylinders 112 allows the platform and arms to descend under the influence of gravity.

To protect the mechanism and moving parts associated with the front platform 50 there is provided a cover plate 115 which is secured to the top surface of the platform main plate 54. Cover plate 115 completely covers the main plate 54 as well as extending fore and aft therefrom so as to overlay the platform operating devices.

Figure 9:
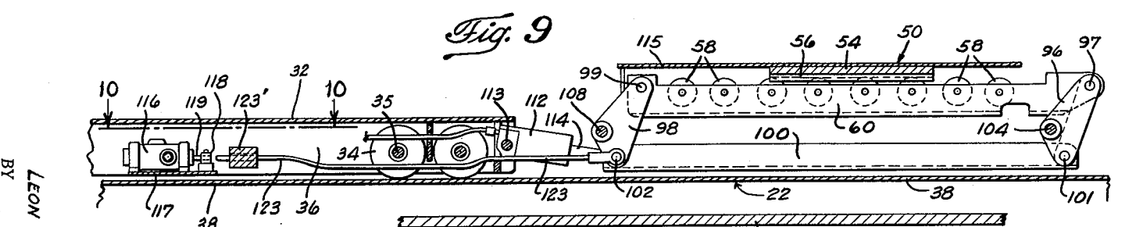
Figure 9 is a longitudinal section of a portion of the forward end of the transfer device as viewed along the line 9—9 of Figure 6 and showing especially a mechanical interlock between the platform raising means and one of the hydraulic valves.
Figure 10:
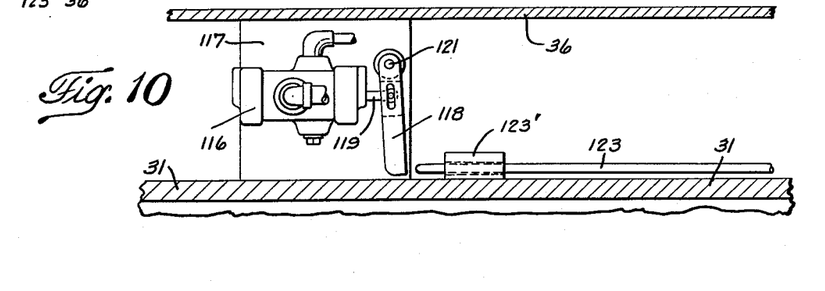
Figure 10 is a plan section taken along the line 10—10 of Figure 9.
Figure 11:
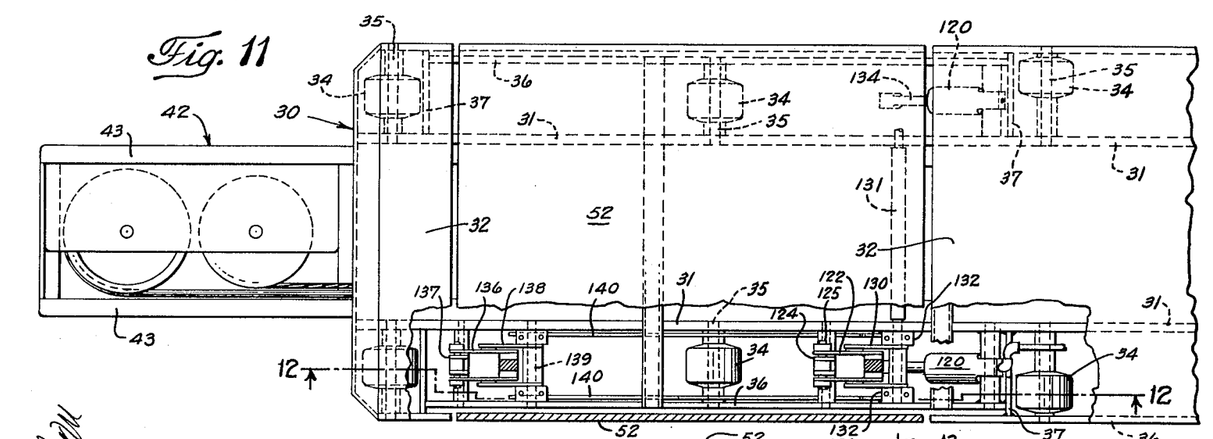
Figure 11 is a fragmentary plan view with parts broken away of the rear end of the transfer device, left as shown in Figure 2, with the various parts in the positions assumed when a vehicle is supported thereon in a raised position.

Referring to Figures 9 and 10 there is shown the means for mechanically influencing the operation of one of the hydraulic valves associated with the operation of the front platform 50. As embodied a valve 116 is mounted upon the dolly somewhat to the rear of the platform by means of a plate 117 welded to and extending between the dolly side member 31 and secondary side member 36 on one side of the dolly. A lever 118 is pivotally mounted at 121 on the plate 117 and midway of its length is connected by a slot and pin arrangement to the end of the stem 119 of the valve 116. The free end of lever 118 is positioned in the path of the end of interlock rod 123 which is slidably supported in bracket 123' adjacent the lever. The other end of the rod 123, as shown in Figure 9, is connected to the pivot 102 of the jack bar raising lever 98. Thus when the lever 98 rotates clockwise from the position shown in Figure 9 the rod 123 meets and rocks lever 118 to push the valve stem 119 into the valve 116. The effect of this action or the operation of the front platform will be described later.

It will be noted that by the arrangement just described the front of a vehicle can be raised from its position of rest by its front wheels only and in such a manner that no part of the dolly can touch and possibly damage any portion of the rods, links or bearings constituting the steering mechanism of the car.

Means for raising the rear of a vehicle so as to be supported on the dolly are provided and as embodied comprise the rear platform 52, a link and lever system beneath each side of the platform by which the platform is movably attached to the dolly and a pair of hydraulic cylinders 120, one on each side of the dolly and connected to the link and lever system on that side, whereby application of fluid pressure within the cylinders will raise the platform. The link and lever system on each side of the platform is identical and consists of a forward (right in Figure 12), pair of links 122 and 124 which are pivotally attached to each other at 125 while link 122 is pivotally secured at 126 to the forward corner of the platform 52 and link 124 is pivotally mounted at 127 on the side member 31 of the dolly. Midway along the length of link 122, one end of a lever 130 is pivotally attached by a pin 128. Lever 130 is pivotally mounted on the dolly by being fixed on one end of a shaft 131 which is journaled in bearing blocks 132 provided on the dolly framing and extending across the dolly. The opposite end of shaft 131 has fixed thereto the corresponding lever 130 which serves the link and lever system on that side of the platform. The piston 134 of hydraulic cylinder 120 is pivotally attached at 135 to the end of lever 130 opposite the pivot 128.

Figure 12:
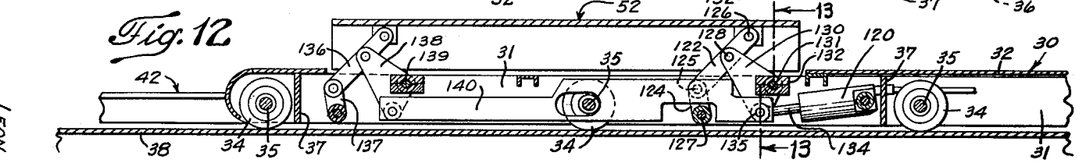
Figure 12 is a longitudinal section taken along the line 12—12 of Figure 11.
Figure 13:
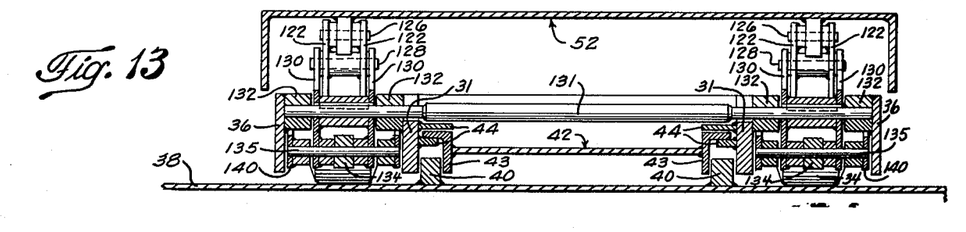
Figure 13 is a transverse section taken along the line 13—13 of Figure 12.

The rear corner of the rear platform 52 is provided with a set of links and levers which is identical to that at the front corner and consists of links 136 and 137, lever 138 and lever fulcrum 139. A similar group of links and levers is provided on the laterally opposite corner of the platform; however, the fulcrum 139 is not constructed as a single shaft as is pivot shaft 131 of the forward levers 130. It is desired that the front and rear link and lever systems on each side of the rear platform act in unison and this is accomplished by connecting the lower ends of the levers 130 and 138 by a link 140. Thus, movement of lever 130 is duplicated in lever 138. The proportions and pivot points of the links 122, 124, 136 and 137 and the levers 130 and 138 are so arranged as shown in Figure 12 that their actuation causes the rear platform 52 to rise and fall vertically in substantially a straight line so that as the platform engages some portion of the underbody of the car, as for instance the differential housing, the platform will have no tendency to move the car in any direction other than vertically. By this arrangement any damage due to pulling and hauling on the car structure is eliminated and mere lifting is provided.

Figure 14:
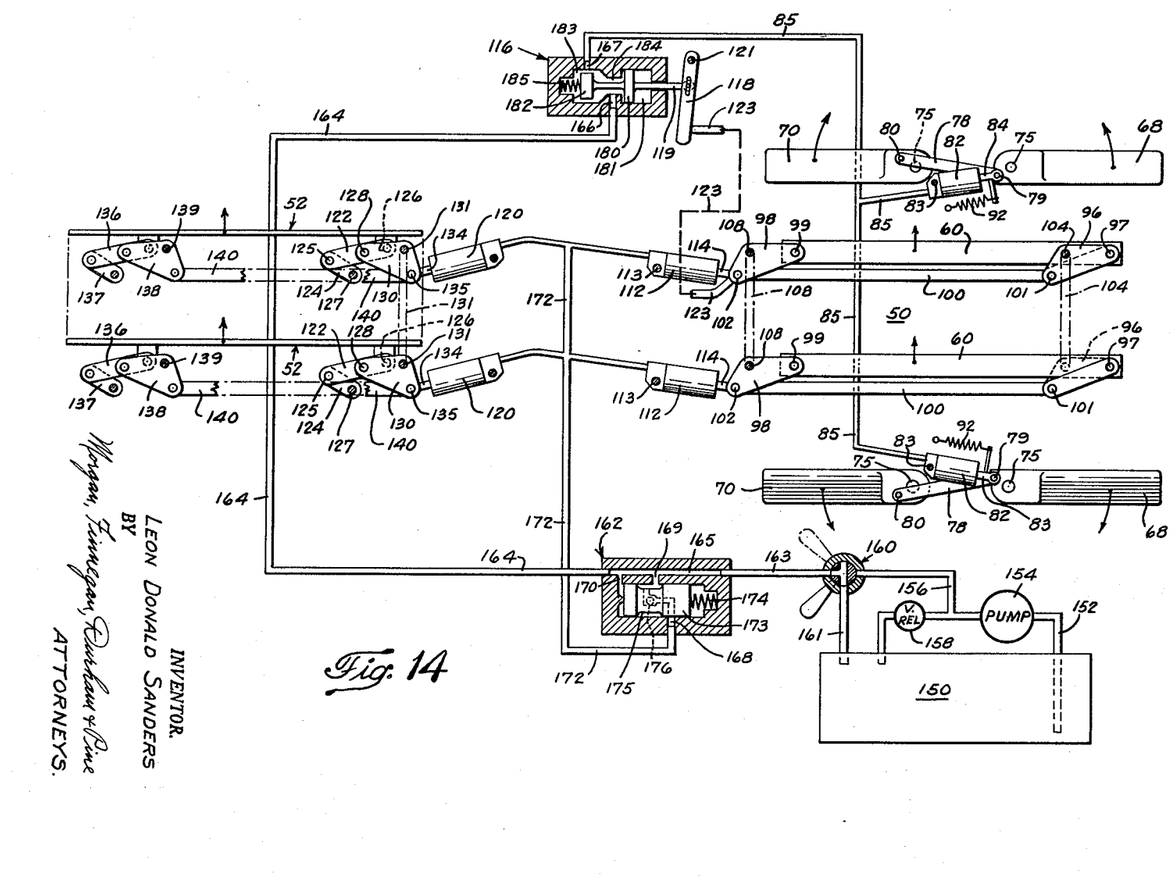
Figure 14 is a schematic diagram of the hydraulic system for operating the vehicle raising devices of the transfer device, with the parts shown in their lowered and retracted positions.

Referring now to Figure 14, a schematic diagram is submitted to illustrate the hydraulic system provided for operating the vehicle raising mechanism of the dolly 30 which consists of the swingable arms 68 and 70, the front platform 50 and the rear platform 52. Little or no showing is made in this schematic to indicate the actual placement of the various conduits, both rigid and flexible, valves pump and tank of the hydraulic system, other than valve 116.

A reservoir or tank 150 is provided for storage of hydraulic fluid and may be conveniently mounted at some point in the carriage 22. Suction line 152 leads from the tank to a motor driven hydraulic pump 154 having a conventional pressure line 156 and a bypass return to the tank through a relief valve 158. The pressure line 156 leads to a manually controlled three-way valve 160 of which one port receives the line 156, another port is connected to a line 161 leading to the tank, and the third port is connected to a pilot-operated valve 162 by a line 163. Leading from the valve 162 is a conduit 164 which, in the form shown, communicates directly with line 163 through a passage 165 in the valve. Line 164 leads to a port 166 in the valve 116 which is influenced in its operation by the jack bar lever 98 (Fig. 9). A second port 167 in the valve 116 receives the line 85, previously mentioned, which leads to the two cylinders 82 that actuate the swingable arms 68 and 70.

The pilot operated valve 162 is provided with three ports 168, 169 and 170, port 168 being connected to the hydraulic cylinders 112 and 120 by a common line 172. The four cylinders 112 and 120 are those which actuate the front platform 50 and rear platform 52 respectively. The spool 173 of valve 162 is movable in one direction by hydraulic pressure supplied through port 170 from passageway 165 and in the opposite direction by a spring 174. The mid-portion of the spool 173 has an annular groove 175 which in one position communicates with the port 169 only but in the opposite position brings port 169 and port 168 into communication with each other. The interior of spool 173 is provided with a check valve 176 in a passageway which leads from the groove 175 to a portion on the spool which is in alignment with the port 168 when the spool is in the position assumed after the spring 174 has actuated it, that is to the left in Figure 14. When in this position the check valve 176 permits flow from port 168 to port 169 but not in the reverse direction.

The sequential operation of the hydraulic cylinders 82 and the cylinders 112 and 120 is automatically determined by the valve 116 the interior of which is provided with a valve stem 119 on which is mounted a piston 180 in chamber 181 and a closure member 182 in a chamber 183 that is spaced from chamber 181 but communicates therewith through a passageway 184. The valve port 166 communicates with the passageway 184 and the chamber 181 is sealed off from chamber 183 when the closure member is moved to the right, as viewed in Figure 14, by the piston 180 or a spring 185. However, the port 166 still remains in communication with the piston chamber 181. Movement of the valve stem 119, and hence the piston 180 and closure member 182, to the left is effected only by the clockwise rotation of jack bar lever 98 which pushes the valve stem in this direction through the means of rod 123 and lever 118. The clockwise rotation of the levers 98 effects the lowering operation of the front platform 50.

*Operation of car raising means*

An operator stationed in the carriage control booth 28 on the elevator 16 first brings the elevator, carriage and one of the transfer devices 24 into proper alignment with a vehicle on a parking area so that the dolly 30 may be advanced longitudinally beneath the vehicle. The positioning of the dolly so as to bring the paired swingable arms 68 and 70 in the proper relative position with the front wheels of the vehicle is not, with the present invention, a critical aligning problem. In the form of invention illustrated herewith a distance of 8 to 10 inches either to the front or rear of the front wheel axles is within the automatic adjustment capacity of the devices on the dolly front platform.

Referring now to Figure 14 and assuming the dolly beneath the vehicle with the swingable arms within about five inches of the axial position of the front wheels of the vehicle and to the rear thereof, the operator manipulates the control valve 160 so as to connect line 156 to line 163 and thereby deliver fluid under pressure from the hydraulic pump 154 to the pilot-operated valve 162. The spring 174 in valve 162 is set to resist movement of the spool 173 until the pressure in the pilot chamber at port 170 is greater than that needed to operate the swingable arms by their cylinders 82. In the present instance this may be a pressure in excess of about 900 p.s.i. Fluid movement from port 169 to port 168 and thence to car raising cylinders 112 and 120 is blocked by the check valve 176 within the valve spool 173. Fluid therefore moves through the passageway 165 of the valve 162, along line 164, into port 167 and line 85 and thus into the rear of the arms operating cylinders 82. Passageway 184 in valve 116 is maintained in an open condition due to the fact that in the lowered position of the front platform of the dolly the interlock rod 123 presses the lever 118, piston 180 and closure member 182 to the left, as viewed in Figure 14.

The pressure now being applied in the arms cylinders 82 start the pair of arms 68 and 70 on each side of the dolly to moving towards their extended position to engage and cradle the vehicle wheels. Since the arms, by assumption, are to the rear of the vehicle wheels the forward arm 68 of each pair meets and engages the vehicle wheel before the rear arm 70 can do so although the arms 68 and 70 are moving towards each other at substantially the same speed. The continuing rotation of the arms 68 now causes a reaction of the front platform 50, for, since the arms 68 are in contact with the vehicle wheels these contacts become fulcrums and the pivots 75 of the arms are moved forwardly in relation to the vehicle. The pivots 75 are journaled in the front platform and therefore carry the platform forward with them, the platform rolling along the jack bars 60 during this motion. (See Figs. 6 and 7.) The arms 70, by their own motion and the advance of the platform, are rapidly brought into contact with the vehicle wheels and thereby brought to a stop so that now the arms 68 and 70 are in their fully extended position and cradling the front wheels of the vehicle.

Since the arms have reached the limit of their movement the pressure in the cylinders 82 begins to build up and back pressure along the conduits 85 and 164 soon passes the preset compression of the spring 174 in the pilot-operated valve 162. As fluid now moves through port 170 into the pilot chamber of the valve 162 the spool 173 is moved to the right, Figure 14, to compress the spring 174 and bring the spool groove 175 opposite both port 169 and port 168. As this occurs the fluid under full pressure flows from the valve passageway 165 into conduit 172 and thence into the rear of each of the four cylinders 112 and 120. Both the front and rear platforms 50 and 52 are thereby caused to rise, lifting the vehicle off the parking area and supporting it upon the dolly.

A safety interlock feature of the hydraulic arrangement is now automatically brought into play. As the jack bar lever 98, to which the interlock rod 123 is attached, rotates counterclockwise, Figure 14, the rod is drawn away from the lever 118 which is attached to the stem 119 of the sequence valve 116. Both the valve spring 185 and the fluid pressure in the passage 184 act upon the piston 180 so that the closure member 182 moves to the right to seal the passageway from the port 167 and line 85. The hydraulic fluid is now locked in cylinders 82 and cannot be discharged until the front platform is lowered. Any danger that the arms will inadvertently be retracted before the car has been lowered to the parking area is thus eliminated.

After the dolly with the car thereon has been drawn back onto the carriage of the elevator it may be transported to a desired stall in the building 10. Lowering the platforms of the dolly to deposit the car in the stall is accomplished by the operator manipulating the control valve 160 so that conduit 163 is connected to line 161 and the tank 150. With the port 170 in pilot valve 162 open to tank the hydraulic fluid can flow from the pilot chamber of the valve and the valve spool is pushed to the left by spring 174. Port 169 is also open to tank so the fluid can discharge from the car lifting cylinders 112 and 120 through line 172, port 168, check valve 176 in the valve spool, port 169 and thence to tank. The weight of the car is the force which moves the fluid from the cylinders 112 and 120 to the tank.

As the front platform reaches its lowered position the interlock rod 123 forces the closure member 182 of sequence valve 116 to the left and thereby opens the passage between ports 167 and 166. The springs 92, associated with the arms, now can retract the arms since the fluid in the cylinders 82 can be discharged to the tank. As soon as this takes place the car is free from the transfer device which can then be withdrawn from beneath the car. All of the mechanism has been returned to a position ready for another cycle.

Figure 15:
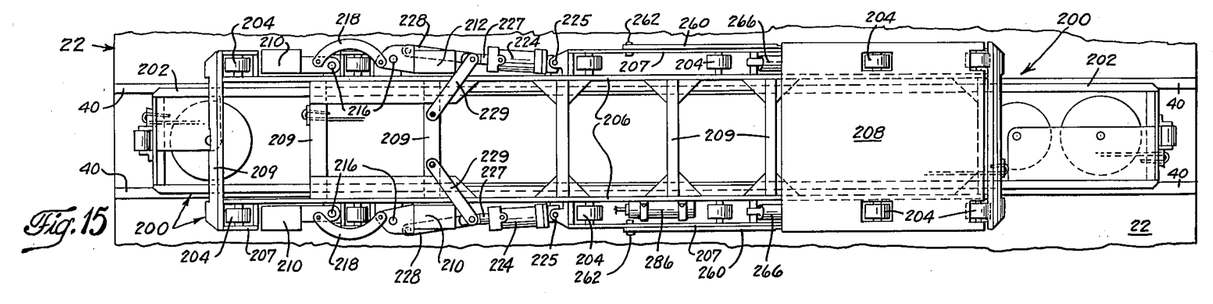
Figure 15 is a plan view of a modified form of transfer device wherein the horizontally swingable arms at the front end of the device are adapted for raising the front of the vehicle by their own motion.
Figure 16:
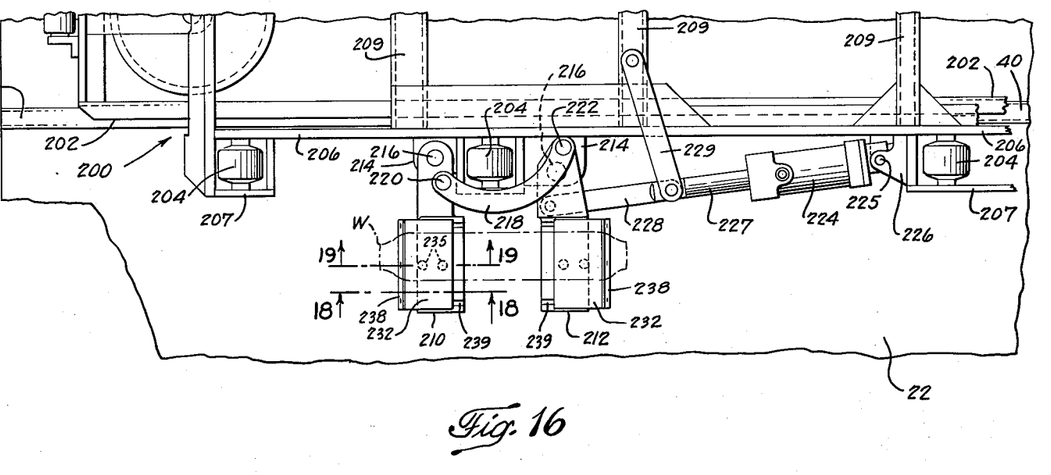
Figure 16 is a fragmentary plan view of a portion of the transfer device shown in Figure 15 but showing the swingable arms in their extended or vehicle raising and supporting position.
Figures 17, 18, 19, 20:
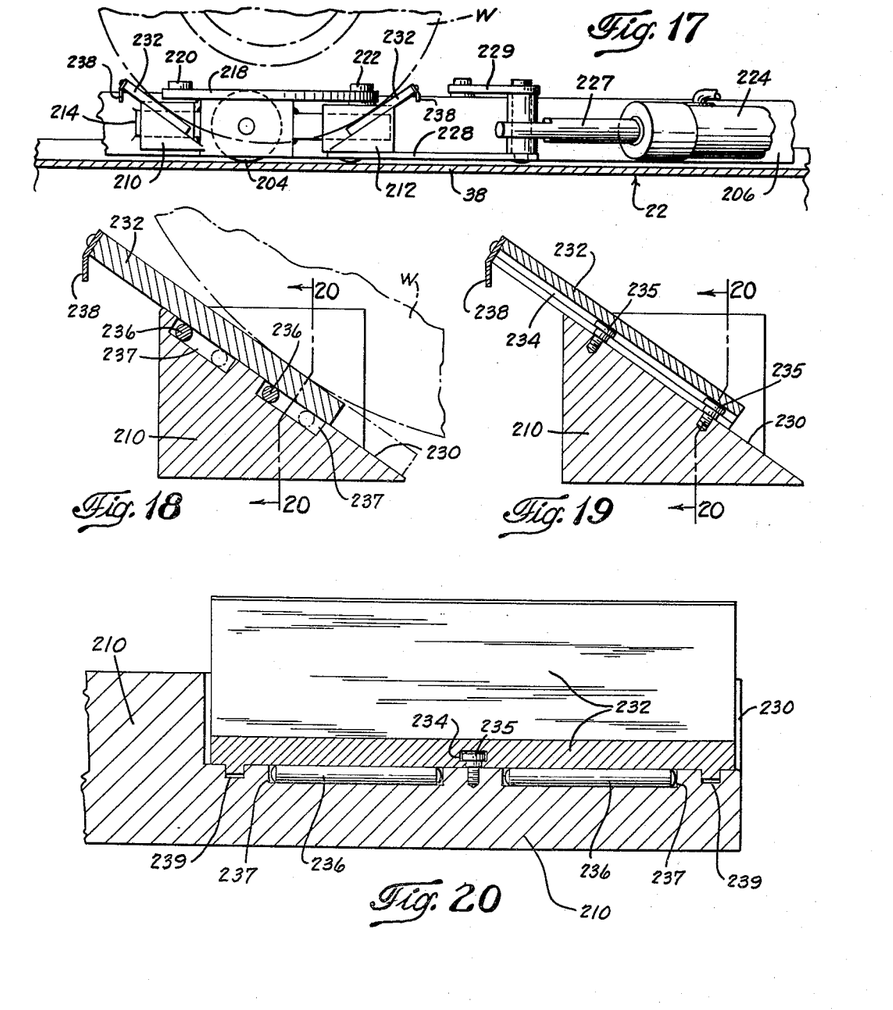
Figure 17 is a fragmentary side elevation of the vehicle raising arms shown in Figure 16.
Figures 18 and 19 are transverse sections of one of the vehicle raising arms as viewed along the lines 18—18 and 19—19 of Figure 16.
Figure 20 is a section along the lines 20—20 of Figures 18 and 19.
Figure 21:
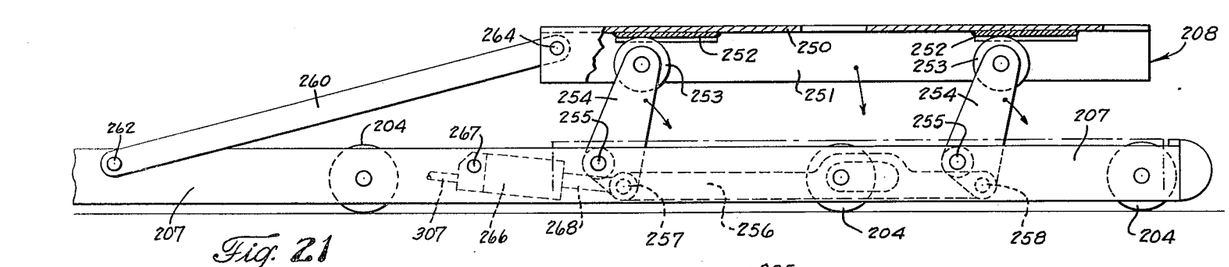
Figure 21 is a fragmentary side elevation partly broken away of the vehicle raising platform at the rear (right) of the transfer device shown in Figure 15.

Reference will now be made to Figures 15 through 22 in which a modified form of transfer device is shown wherein a front platform on the dolly has been omitted and the swingable arms alone adapted to engage the front wheels of a vehicle and by the continued motion of the arms raise the wheels and hence the front of the car from the parking area. As shown in Figures 15 and 16 the front of the transfer device is to the left, the rear towards the right.

As in the preferred form of transfer device previously described this form is also comprised of a dolly 200 and an extension slide 202, dolly rollers 204 the trunnions of which are journalled in elongated side members 206 and secondary side members 207 and a rear platform 208 movably attached on the dolly. The side members 206 are tied together in parallel spaced relationship by tie members 209.

On each side of the dolly 200 near the front thereof there is provided a pair of car wheel engaging members consisting of arms 210 and 212 adapted to swing in a horizontal plane from a position adjacent and parallel to the dolly side member 206 to a car wheel engaging position substantially at right angles to the side member. Each of the arms 210, 212 is pivotally mounted on a bracket plate 214 by a stub shaft 216, with the bracket plate welded on the side member 206. The arms are interconnected by a link 218 which is pivotally attached to arm 210 by a stud 220 at a point between the arm pivot 216 and the outer end of the arm and is pivotally secured upon the arm 212 by a stud 222 which is positioned so that arm pivot 216 lies between the stud 222 and the inner end of arm 212. By this arrangement of link 218 when one arm is moved the other arm moves substantially the same amount but in the opposite direction.

The pair of arms 210 and 212 on each side of the dolly 200 is actuated by a double acting hydraulic cylinder 224 which is pivotally secured by a stud 225 to a bracket 226 that forms a part of the dolly structure. The end of the piston rod 227 which projects from the cylinder 224 is connected to the arm 212 by a link 228 and to one of the dolly tie members 209 by a guide link 229. The application of hydraulic pressure in the cylinder 224 rotates the arms from a position parallel to the side members 206 of the dolly as shown in Figure 15 to an extended position substantially at right angles to the dolly whereby the vehicle wheel W may be engaged as shown in Figure 16.

Each of the arms 210 and 212 has the upper surface of its outer portion somewhat sharply beveled as at 230 and these bevels are inclined downwardly and toward each other when the arms are in their extended position. See Figures 18, 19 and 20. The longitudinal spacing of the arm pivots 216 on the dolly is such that the arms engage the car wheel before they have reached their fully extended position and further movement of the arms is utilized to raise the car wheel W and hence the front of the vehicle. Provision must be made, however, for ease of arm rotation after the arms have made their first contact with the car wheel because further rotation would be greatly resisted by the friction between beveled surfaces and the rubber tire of the wheel. Such provision has been made by equipping each beveled surface 230 with a rolling plate 232 which is normally at rest on the lower portion of the bevel surface 230. Each plate 232 has a T-slot 234 that is centrally disposed in the plate and in conjunction with two retaining screws 235 that are seated in the T-slot and threaded into the bevel surface 230 serves to retain the plate 232 on the arm yet permit its movement up and down the beveled surface. Reduction of friction between the plate 232 and beveled surface 230 is attained by means of rollers 236 which are interposed between them. Rollers 236, four in the present embodiment, are mounted in recesses 237 in the beveled surface 230 with the width of the recess in the up and down direction of the bevel being sufficient to permit the rollers to move one or two inches along the bevel and thus permit the plate 232 that rests upon the rollers to move up and down the bevel substantially double that distance or two to four inches. By this arrangement as the arms rotate towards their extended position they first bring the plates 232 on each arm into contact with the car wheel W. As the arms continue towards each other the friction between the rubber tire and the plates 232 prevent any relative movement between tire and plates but the plates are forced upwardly along the converging beveled surfaces of the arms thereby raising the car wheel and hence the front of the car off the parking area. Reversal of the hydraulic pressure in cylinders 224 reverses the action of the plates 232 and arms 210 and 212 so that the car front is returned gently to the parking surface and the arms then brought back against the dolly sides and thus out of the way of the car wheels. Protection of the rollers 236, recesses 237 and T-slot 234 is given by a depending cover plate 238 which may be secured along the upper back edge of the plates 232 and a tongue and groove arrangement 239 formed between the plates 232 and the beveled surfaces 230 adjacent the lateral edges of the plates.

The rear platform 208 provides the means for raising the rear of the vehicle from the parking area and supporting it upon the dolly 200. The platform consists of a horizontally disposed platen 250 (Fig. 21) which may be rectangular in shape and have depending sides 251. Near each of the four corners of the platen 250 on the underside thereof is welded a grooved wear plate 252 adapted to rest upon a roller 253 which is carried at one end of a jack lever 254. There are four such jack levers 254 in the present embodiment two of which are in spaced, longitudinal alignment with each other on one side of the dolly and the remaining two similarly disposed on the other side of the dolly. The pair of levers 254 on each side of the dolly are pivoted between the dolly side member 206 and 207 by studs 255 and the ends of the levers opposite the rollers 253 are tied together by a link 256 which is pivotally connected to each lever by the studs 257 and 258.

Longitudinal movement of the rear platform 208 in relation to the dolly 200 is undesirable so means are provided to prevent the platform from partaking of the arcuate motion of the jack levers 154 as their rotation serves to raise and lower the rear platform. As embodied a link 260 is provided on each side of the dolly having one end pivotally attached to the dolly secondary side member 207 at 262 and the other end pivotally secured at 264 to the forward corners of the rear platform side walls 251. The length of link 260 is such that the slight arcuate motion it gives to the platform during the raising and lowering of the platform is immaterial.

The rotation of the pair of jack levers 254 on each side of the dolly 200 so as to raise and lower the rear platform 208 is accomplished by a hydraulic cylinder 266 pivotally secured at 267 on the dolly side members 206 and 207 and having the outer end of its piston rod 268 attached to the pivot stud 257 at one end of the forward jack lever 254. Application of hydraulic pressure in the cylinder 266 rotates the jack levers counter-clockwise to raise the rear platform 208 and release of pressure permits the platform to descend by the weight of itself and, if present, a vehicle. The descent is gradual and controllable by means of conduit size and metering effects of various valves.

Figure 22:
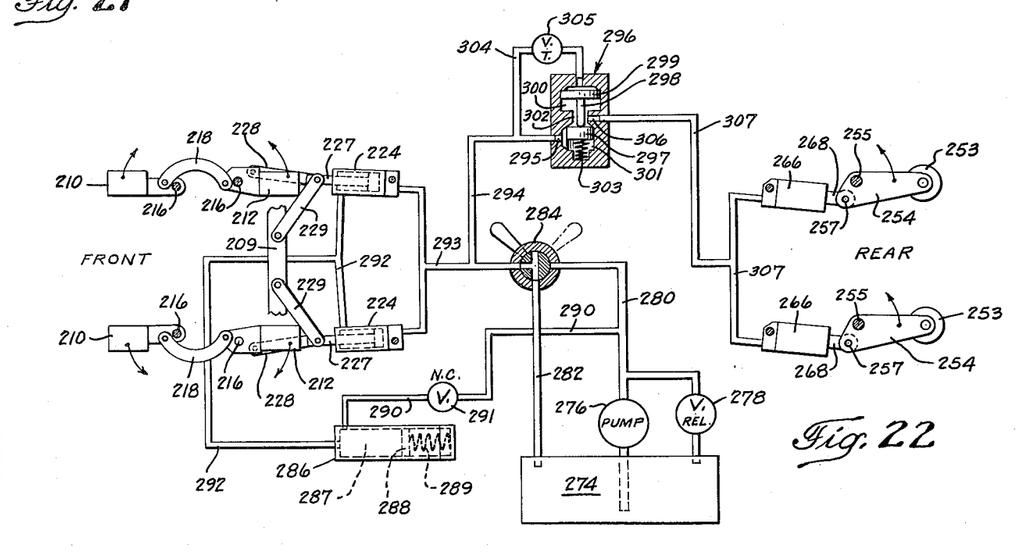
Figure 22 is a schematic diagram of a hydraulic system for operating the vehicle raising portions of the transfer device shown in Figure 15.

In Figure 22 there is shown in diagrammatic form a hydraulic system by which the desired sequential movements of the swingable arms and the rear platform of the form of dolly shown in Figures 15 through 21 may be attained. A conventional fluid reservoir or tank 274 is provided along with motor driven hydraulic pump 276, pressure relief valve 278, pressure line 280 and return line to tank 282 and a three-way manual control valve 284.

In the preferred form of swingable arms previously described the return of the arms from extended to retracted position was accomplished directly by spring means whereas in the form now being discussed the retraction of the arms is indirectly accomplished by means of a fluid pressure accumulator 286 consisting of a fluid chamber 287, piston 288, and a compression spring 289 adapted to be compressed by the piston 288 as fluid is forced into chamber 287. A bypass conduit 290 that incorporates a normally closed valve 291 connects the chamber 287 to pressure line 280 whereby the accumulator may be initially charged with a desired pressure of fluid. The fluid chamber 287 is connected to the fronts of the cylinders 224 by a line 292. The backs of the cylinders 224 are connected to the control valve 284 by conduit 293. Branching from the line 293 is a line 294 which connects to port 295 in a pilot operated valve 296. The interior of pilot valve 296 contains a spool 297, a spool chamber 301 in which it oscillates, a passage 302 from chamber 301 into a piston chamber 300 that has a piston 299 therein. Piston 299 is provided with a stem 298 which extends through the passage 302 so as to engage the spool 297 and affect the spool movement during certain phases of operation. A compression spring 303 in the spool chamber 301 urges the spool in a direction to close the passage 302 between the two chambers. Spool 297 is smaller in diameter than the piston 299 thus contributing a pressure differential by which certain actions of the valve are affected. A bypass or pilot line 304 leads from line 294 to the distal end of the piston chamber 300 of valve 296 and has an adjustable throttle valve 305 incorporated therein. Pilot valve 296 has a port 306 leading into the passage 302 and a line 307 connects this port to the two cylinders 266 which operate the rear platform 208 through jack levers 254.

*Operation of modified form of car raising means*

Assuming the dolly 208 properly positioned beneath a passenger automobile with the swingable arms opposite the front wheels of the vehicle, the operator then rotates the three-way valve 284 clockwise to admit hydraulic pressure from the pump 276 into line 293 and to the rear of the pistons in arms cylinders 224 thereby swinging the arms into engagement with the vehicle wheels and then to raise the wheels and the front of the car from the parking surface to be supported on the dolly. During this motion the fluid in the front of cylinders 224 is forced out and along the line 292 to the accumulator 286 where it forces the piston 288 to compress the spring 289 thus storing up energy. As fluid pressure enters line 293 it also enters line 294 and chamber 301 of pilot valve 296 where its pressure is added to that of spring 303 to keep passage 302 closed by means of spool 297. Pressure is also transmitted along line 304 and thus against the piston 299 of the pilot valve. The buildup of pressure here is retarded by the metering of the fluid as it passes through the throttle valve 305 in line 304 but in due course a differential of pressure is established so that the pressure on piston 299 becomes greater than the combined pressure of the fluid and spring 303 against spool 297. The stem 298 on piston 299 then moves the spool 297 so as to open the passage 302 to the spool chamber 301 thus permitting fluid to flow from port 295 through passage 302 into line 307 and thence into the rear of cylinders 266 which causes the jack levers 254 to rotate counter-clockwise and raise the rear platform 208 and with it the vehicle. Control valve 284 is then set at a neutral point which locks the pressure in all the cylinders 224 and 266 and holds the car in its raised position and supported on the dolly. The dolly may now be moved onto the carriage and elevator and transported to the desired parking area where it is moved off the carriage and, for instance, moved into a stall in the building 10.

It will be noted from the above that the setting of the metering valve 305 and the pilot valve 296 become the elements which determine that the swingable arms are actuated to engage and raise the front wheels of the vehicle before the rear of the vehicle is raised which assures a firm control of the balance of the car upon the dolly since the rear platform may only contact the car at one point such as the differential housing.

Lowering of the car from the dolly onto the parking area may now be effected by the operator setting the control valve 284 to the position shown in Figure 22 thus opening the line 293 to the tank 274. All pressure is now relieved in the rear of cylinders 224 and 266 and the weight of the vehicle forces the fluid out of the cylinders 266 through pilot valve 296, via passage 302 and port 295, and thence by lines 294 and 282 to tank 274. During this time the fluid in back of the pilot valve piston 299 is slowly forced out through the metering valve 305 by means of the spring 303 and spool 297 until the spool 297 eventually is seated to close the passage 302 in readiness for the next cycle.

The lowering of the front of the vehicle is effected by both the weight of the car and the energy previously stored in the accumulator 286. Initially each pair of swingable arms are forced away from each other by the wedging action of the descending roller plates 232 on the arms thus forcing fluid from the rear of cylinders 224 back to tank 274. Also contributing to this fluid movement is the flow of fluid from the accumulator 286, as urged by spring 289 and piston 288, into the front of cylinders 224. As the car settles upon the parking area the arms must still be moved so as to clear the vehicle wheels to permit withdrawal of the dolly from beneath the vehicle. This action which folds the arms against the sides of the dolly is effected solely by the flow of fluid from the accumulator.

The invention in its broader aspects is not limited to the specific mechanism shown and described but departures may be made therefrom, within the scope of the accompanying claims, without departing from the principles of the invention and without sacrificing its chief advantages.

What is claimed is:

1. An automobile parking facility comprising a multi-story building, an elevator operative to transport automobiles to and from the various floors thereof, a dolly forming part of the elevator and longitudinally movable to and from the elevator for transferring automobiles thereto and therefrom, means forming part of said dolly for lifting an automobile after the dolly is disposed therebeneath so that the automobile is supported by and movable with the dolly, said means comprising motor operated jacking means generally at one end of the dolly for lifting one end of the automobile and separate and independent motor operated jacking mechanism at the other end of the dolly for lifting the other end of the automobile, said jacking mechanism including support means adapted to be raised and lowered, base means upon which said support is mounted, said support being movable longitudinally of the dolly along said base means, means operative to resiliently urge the support to a predetermined longitudinal position on the dolly, a first pair of arms mounted on said support means for generally horizontal pivotal movement from a retracted position where they permit unobstructed positioning of the dolly beneath an automobile and an extended position where they extend laterally from one side of the dolly, and are effective to cradle a wheel of an automobile, a second and similar pair of arms mounted on said support means and extendable from the other side of dolly generally opposite said first pair of arms, motor means operative to pivotally move said pairs of arms from their retracted to their extended positions and additional motor means operative to raise said support means and said jacking means.

2. The organization of claim 1 wherein said base means includes a pair of laterally spaced jack bars disposed at each side of the support means and having rollers engaging the same.

3. The organization of claim 2 wherein the jack bars are upwardly open channels in which are mounted rollers that project from the upper edge thereof.

4. The organization of claim 2 wherein the jack bars are connected generally at each end with a lever pivoted to the dolly, the pair of levers at each side of the support being interconnected by a link for simultaneous pivotal movement, and a fluid pressure operated motor connected with one link of each pair.

5. The organization of claim 4 wherein the levers of each pair at one end of the bars are fixed to a common pivot mounting shaft and the levers of each pair at the other end of the bars are also fixed to a common pivot mounting shaft.

6. The organization of claim 1 wherein a pair of oppositely acting spring means are provided to resiliently bias the support to said predetermined position, said springs having one end connected with the support and the other end with the dolly frame.

References Cited in the file of this patent

UNITED STATES PATENTS

| | | |
|---|---|---|
| 1,627,135 | Ario | May 3, 1927 |
| 1,817,220 | Young | Aug. 4, 1931 |
| 1,962,127 | Balkema et al. | June 12, 1934 |
| 2,629,507 | Olson | Feb. 24, 1953 |
| 2,801,011 | Overlach et al. | July 30, 1957 |
| 2,840,248 | Grove et al. | June 24, 1958 |
| 2,846,186 | Smith | Aug. 5, 1958 |
| 2,849,131 | Smith et al. | Aug. 26, 1958 |
| 2,899,087 | Jacobsen | Aug. 11, 1959 |